Dec. 2, 1952     C. E. SUNDERLAND     2,620,390
AUTOMATIC EMERGENCY KEYER UNIT
Filed July 3, 1950
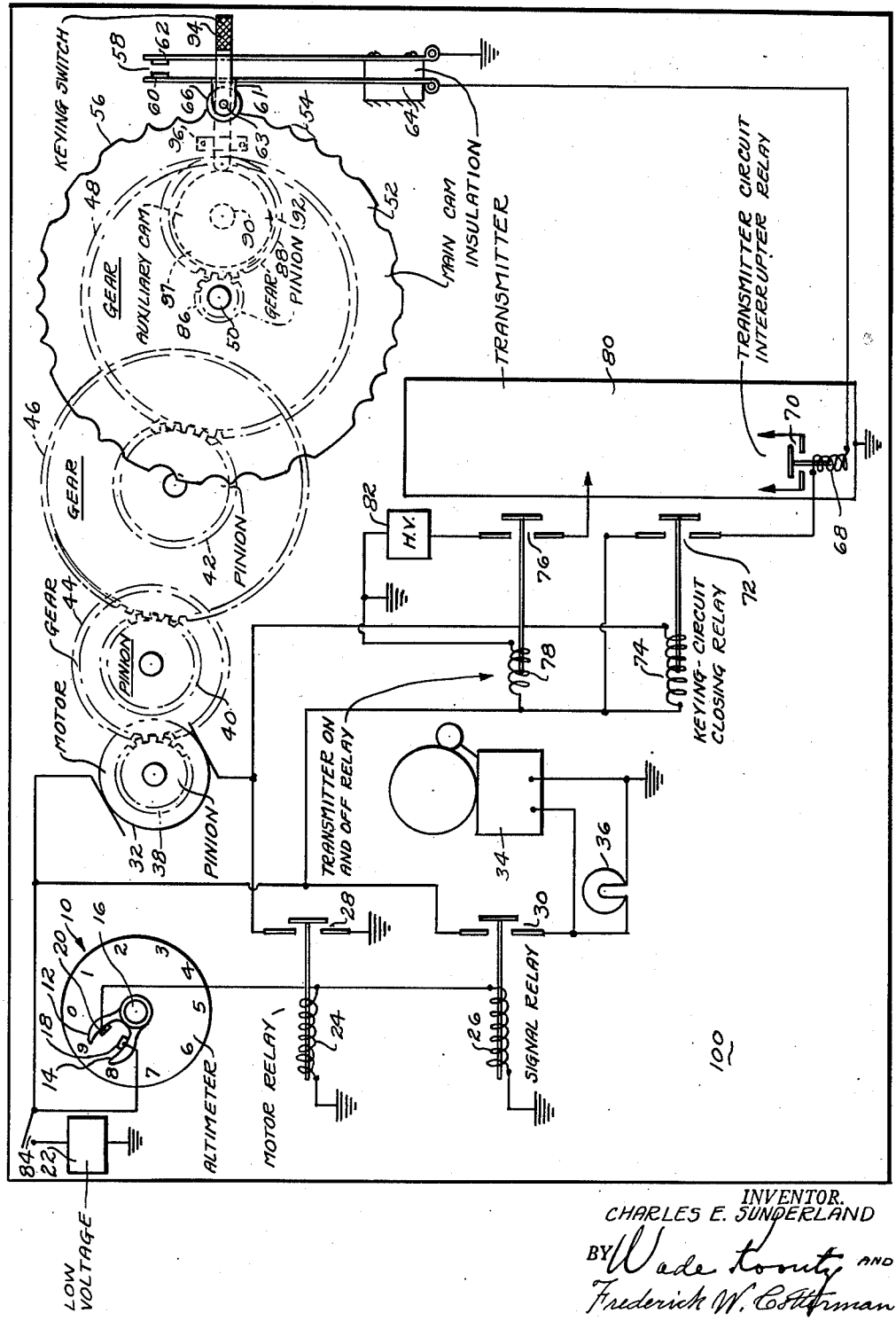
INVENTOR.
CHARLES E. SUNDERLAND
BY Wade Koontz AND
Frederick W. Cottman
ATTORNEYS Patented Dec. 2, 1952

2,620,390

UNITED STATES PATENT OFFICE 2,620,390

AUTOMATIC EMERGENCY KEYER UNIT

Charles E. Sunderland, Mobile, Ala.

Application July 3, 1950, Serial No. 171,998

5 Claims. (Cl. 177—380)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a device for automatically keying a distress signal by way of the radio transmitter of an aircraft.

It frequently happens that the pilot of an aircraft, in distress, delays sending out an SOS in the hope that the trouble may be righted and a crash avoided. Usually when he does decide that a crash cannot be avoided it is either too late to key out a distress call manually, or the craft may be pitching and rolling to such an extent as to make manipulation of the conventional hand key impossible.

The embodiment of the invention herein shown and described is so constructed and arranged that a distress call is automatically sent out upon a preset drop in altitude whether or not the pilot desires it.

After a predetermined series of distress calls comprising alternate SOS and ship's identification calls, the device automatically temporarily suspends these calls long enough to send between each series a prolonged buzz of about twenty seconds which may be used by such land stations as may pick up the call to facilitate direction finding operations.

The altimeter herein shown as part of the invention may be one especially constructed for the purpose disclosed, or the altimeter already on the aircraft may, with slight modification, be adapted for use without interference with its normal function.

Also, the radio transmitter through which the distress message is to be sent is the one already provided on the plane with no change further than the wiring for electrically connecting the old and the new instrumentalities.

The single figure of the drawing is schematic only, the several instrumentalities being spaced apart for clearness. It will be understood, however, that the several instruments may be arranged, assembled and electrically or otherwise connected in a fraction of the space as the assembly herein discloses.

Referring now to the drawing, the altimeter 10 of an aircraft has a pointer 12 which registers the height in thousands of feet at which the craft is being flown, in the instant case this is nine thousand feet.

A second pointer 14 is independently rotatable by a knob 16 and when rotated clockwise will cause the contact 18 on the pointer 14 to electrically engage the contact 20 on the pointer 12. In the drawing the pointer 14 is arbitrarily set at eight thousand feet whereby, when the altimeter pointer 12 shows a drop of one thousand feet the contacts 18 and 20 will engage.

Engagement of contacts 18 and 20 allows low voltage current to flow from the D. C. source 22 through relay energizing coils 24 and 26 to ground, thereby closing relay switches 28 and 30 thus completing a circuit from the source 22 through a motor 32 and switch 28 to ground and from the source 22 through a switch 30, bell 34 and light 36 to ground.

Upon starting of the motor 32, power is transmitted through pinions 38, 40 and 42 and gears 44, 46 and 48 to the shaft 50 upon which a main keying cam 52 is rotatable. Main keying cam 52, around its periphery, is provided with a series of short nodes 54 representing dots, and longer nodes 56 representing dashes of the International Code.

The automatic keying switch 58 consists of two insulatedly spaced apart flexible blades 60 and 62 fastened as at 64 to any suitable stationary portion of the device. Blade 60 has two ears 61 between which a small shaft 63 carries a roller 66 which is engaged by the nodes 54 and 56 to close the keying switch for dots and dashes. Blade 62 is grounded as shown.

Blade 60 is electrically connected to the low voltage source 22 through the relay coil 68 which operates the interrupter switch 70 of the high voltage transmitter circuit in synchronism with the keying switch 58, and through the switch 72 which is in series with the coil 68. The switch 72 is closable by the coil 74 which gets current from the low voltage source 22, one end of the coil being grounded but only when the switch 28 is closed, whereby the keying relay may be operative only when the altimeter contacts 18 and 20 are closed by the predetermined drop in altitude.

The transmitter on-and-off relay comprises a switch 76 and its operating coil 78. The coil 78 has one end connected to the low voltage supply irrespective of whether the altimeter contacts are open or closed and the other end is grounded, whereby the transmitter 80 may be used for normal service without regard to altitude. The high voltage supply 82 is applied to the transmitter whenever the switch 76 closes. A manual switch 84 may be inserted in the low voltage line as shown.

Attached to the gear 48 to rotate therewith is a small pinion 86 which drives a gear 88 rotatable on a stud 90. An auxiliary keying cam 92 is attached to the gear 88 to rotate therewith, the cam follower rod 94 being reciprocable in bearings 96.

The small shaft 63 upon which the roller 66 rotates is prolonged to extend through an opening in the follower rod 94, whereby the blade 60 may be reciprocated by the nodes 54, 56, or, at intervals corresponding to four or five revolutions of the main cam 52, by the dwell lobe 97 on the auxiliary cam 92.

The device herein shown and described operates substantially as follows:

As soon as the pilot has reached the altitude at which he intends to fly, he sets the pointer 14 to an altitude somewhat lower than that of his intended flying course. If, due to some trouble, he starts to lose altitude, the pointer 12 will rotate anticlockwise until the contact 20 engages the contact 18.

This will light the lamp bulb 36, ring the bell 34 and start the motor 32 which rotates the automatic keying cam 52 upon which the short and long nodes 54 and 56 for international code dots and dashes alternately spell out an SOS, then the ship's call letters, and, at intervals of four or five revolutions of the cam 52 suspend the call and send out a twenty-second continuous signal which may be used by rescuing stations to get the direction of the ship or by several spaced apart stations to determine the ship's location. The various instrumentalities above described may preferably be assembled and mounted in or on some sort of cabinet, panel, base or frame 100 as dictated by its position in the airplane.

Having described my invention, I claim:

1. An automatic emergency keying unit which comprises, in combination, an altimeter, two relatively movable electric contacts carried by said altimeter, means associated with said altimeter operated by a preset drop in altitude to engage said two electric contacts, a low voltage current source, a signal light, a signal bell, a motor and a keying switch, a motor operating relay and a signal operating relay both operative by closing of said contacts to direct an electric current from said low voltage current source through electrical conducting means to said signal light, said signal bell, said motor and said keying switch, a keying switch main cam in the form of a rotatable disc having a plurality of short and long nodes adapted upon rotation for opening and closing said keying switch for dot-and-dash signals, an auxiliary rotatable cam having one prolonged circumferentially extending node adapted for holding said keying switch closed for a prolonged uninterrupted signal, speed reducing gearing drivably connecting said motor to said main cam, speed reducing gearing drivably connecting said main cam to said auxiliary cam, a keying-circuit-closing relay having one end of its operating coil connected through conductors to the low voltage current source and the other end through conductors and the motor relay switch to ground whenever the motor relay switch is closed, said keying circuit closing relay being adapted when closed for connecting said keying switch through a keying switch circuit to said low voltage current source, a transmitter-circuit-interrupter relay having its operating coil connected in series with the keying switch circuit, a high voltage current source, and a transmitter on-and-off relay energizable from the low voltage current source to close and connect the high voltage current source to the transmitter circuit.

2. An automatic emergency keying unit which comprises an altimeter, two relatively movable electric contacts associated with said altimeter, means associated with said altimeter operated by a preset drop in altitude to engage said two electric contacts, a low voltage current source, a signal means, a motor and a keying switch, relay means operative by closing of said contacts to direct an electric current from said low voltage current source through electrical conducting means to said signal, said motor and said keying switch, a keying switch main cam in the form of a rotatable disc having a plurality of short and long nodes adapted upon rotation of said cam for opening and closing said keying switch for dot-and-dash signals, an auxiliary rotatable cam having one prolonged circumferentially extending node adapted for holding said keying switch closed for a prolonged uninterrupted signal, speed reducing gearing drivably connecting said motor to said main cam, speed reducing gearing drivably connecting said main cam to said auxiliary cam, a keying-circuit-closing relay having one end of its operating coil electrically connected to the low voltage current source and the other end through the motor relay switch to ground whenever the motor relay switch is closed, said keying circuit closing relay being adapted when closed for connecting said keying switch through a keying switch circuit to said low voltage current source, a transmitter-circuit-interrupter relay having its operating coil connected in series with the keying switch circuit, a high voltage current source, and a transmitter on-and-off relay energizable from the low voltage current source to close and connect the high voltage current source to the transmitter circuit.

3. An automatic emergency keying unit which comprises, an altimeter, two relatively movable electric contacts, means associated with said altimeter operated by a preset drop in altitude to engage said two electric contacts, a low voltage current source, a motor and a keying switch, a motor operating relay operative by closing of said contacts to direct an electric current from said low voltage current source to said motor and said keying switch, a keying switch rotatable main cam having a plurality of short and long nodes adapted upon rotation for opening and closing said keying switch for dot-and-dash signals, an auxiliary cam having one prolonged node adapted for holding said keying switch closed for an uninterrupted signal, speed reducing gearing drivably connecting said motor to said main cam, speed reducing gearing drivably connecting said main cam to said auxiliary cam, a keying-circuit-closing relay having one end of its operating coil electrically connected to the low voltage current source and the other end through the motor relay switch to ground whenever the motor relay switch is closed, said keying circuit closing relay being adapted when closed for electrically connecting said keying switch to said low voltage current source, a transmitter-circuit interrupter relay having its operating coil connected in series with the keying switch, a high voltage current source, and a transmitter on-and-off relay energizable from the low voltage current source to close and connect the high voltage current source to the transmitter circuit.

4. An emergency keying unit which comprises, relatively movable electric contacts, means operated by a drop in altitude to engage said electric contacts, a current source, a motor and a keying switch, both operative by closing of said contacts, a main cam having a plurality of nodes adapted for opening and closing said keying switch for dot-and-dash signals, an auxiliary cam having a prolonged node adapted for holding said keying switch closed for an uninterrupted signal, gearing drivably connecting said motor to said main cam, gearing drivably connecting said main cam to said auxiliary cam, means for connecting said keying switch to said low voltage current source, a transmitter-circuit interrupter relay having its operating coil connected in series with the keying switch, a high voltage current source, and a transmitter on-and-off relay energizable from the low voltage current source to close and connect the high voltage current source to the transmitter circuit.

5. In an emergency keying device, an altimeter having an altitude graduation and two pointers, one pointer movable along said graduation by change in the altitude of said altimeter and the other pointer manually operable to indicate a lesser altitude, electrical contacts movable into engagement by said pointers, when both pointers point to the same altitude graduation, signalling means and a motor operable upon engagement of said contacts, a main cam operable at a low speed by said motor and an auxiliary cam operable at a still lower speed by said motor, said main cam being peripherally provided with short lobes for dot and dash signals and said auxiliary cam with one prolonged lobe for a direction finding signal, a keying switch operable to on and off positions by operation of the main cam through several revolutions of the main cam then by operation of the auxiliary cam through part of a revolution of the auxiliary cam.

CHARLES E. SUNDERLAND.

REFERENCES CITED

The following references are of record in the file of this patent:

UNITED STATES PATENTS

| Number | Name | Date |
|---|---|---|
| 1,972,289 | Chauveau | Sept. 4, 1934 |
| 2,358,498 | Espeseth | Sept. 19, 1944 |
| 2,389,786 | Kohn | Nov. 27, 1945 |
| 2,468,945 | Sasser | May 3, 1949 |
| 2,500,809 | Fennessy et al. | Mar. 14, 1950 |